US008971344B2

(12) United States Patent
Bangalore et al.

(10) Patent No.: US 8,971,344 B2
(45) Date of Patent: *Mar. 3, 2015

(54) TERMINAL CAPABILITIES SET EXCHANGE BETWEEN HETEROGENEOUS ENDPOINTS

(71) Applicant: Cisco Technology, Inc., San Jose, CA (US)

(72) Inventors: Manjunath Bangalore, San Jose, CA (US); Kan Wu, Milpitas, CA (US); Steven G. Fry, Oakland, CA (US); Parameswaran Kumarasamy, San Jose, CA (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/925,541

(22) Filed: Jun. 24, 2013

(65) Prior Publication Data

US 2013/0290550 A1    Oct. 31, 2013

Related U.S. Application Data

(63) Continuation of application No. 11/505,556, filed on Aug. 16, 2006, now Pat. No. 8,472,453.

(51) Int. Cl.
*H04L 12/28* (2006.01)
*H04L 12/56* (2006.01)
*H04J 3/16* (2006.01)
*H04L 29/06* (2006.01)

(52) U.S. Cl.
CPC .......... *H04L 65/1069* (2013.01); *H04L 65/104* (2013.01); *H04L 69/24* (2013.01); *H04L 65/605* (2013.01); *H04L 69/08* (2013.01); *H04L 65/1006* (2013.01); *H04L 65/1009* (2013.01)
USPC ............................ 370/401; 370/410; 370/467

(58) Field of Classification Search
None
See application file for complete search history.

(56) References Cited

U.S. PATENT DOCUMENTS

| 7,002,989 | B2 | 2/2006 | Agrawal et al. |
| 8,059,656 | B1 * | 11/2011 | Telikepalli et al. ........ 370/395.2 |
| 2003/0236892 | A1 | 12/2003 | Coulombe |
| 2006/0013148 | A1 | 1/2006 | Burman et al. |
| 2008/0037566 | A1 * | 2/2008 | Rasanen ....................... 370/401 |
| 2008/0192733 | A1 * | 8/2008 | Song et al. .................... 370/352 |

OTHER PUBLICATIONS

Handley, et al., RFC 2327, SPD: Session Description Protocol, Apr. 1998.
Singh, et al., Internetworking Between SIP/SDP and H.232, published May 12, 2000, http://www1.cs.columbia.edu/-kns10/publication/draft-singh-sip-h323-01.pdf.

(Continued)

*Primary Examiner* — Brian Roberts
*Assistant Examiner* — Cassandra Decker
(74) *Attorney, Agent, or Firm* — Haynes and Boone, LLP

(57) ABSTRACT

In one embodiment, a method includes receiving at a protocol translator a first message from a first endpoint to a second endpoint. The first message includes a list of media capabilities of the first endpoint. The method also includes transmitting from the protocol translator a second message to the second endpoint including a media capabilities request header and receiving at the protocol translator a response message from the second endpoint. The response message includes a response header including a list of the media capabilities of the second endpoint.

7 Claims, 6 Drawing Sheets

(56) References Cited

OTHER PUBLICATIONS

Huitema, Christian, Providing H.245 like capabilities exchange with Megaco, 1999, http://ftp.ist.utl.pt/pub/drafts/draft-huitema-megaco-discuss-sdp-01.text.

Internetworking between SIP/SDP and H.232 in view of 3GPP Specification 3GPP, Technical Spefication Group Core Network, Feasibility Study for the Multimedia Internetworking between IM CN subsystem and CS networks, release 7, May 16, 2006.

\* cited by examiner

INVITE sip:8787@1.7.56.55:5060 SIP/2.0
Via: SIP/2.0/UDP 1.7.56.102:5060;branch=z9hG4bK5AB
From: <sip:1.7.56.102>;tag=5B9F658-18A0
To: <sip:8787@1.7.56.55>
X-media-caps-request: Yes
Content-Type: application/sdp
Content-Length: 179 m=audio 17012 RTP/AVP 0 8 18 9 4 15 101
c=IN IP4 1.7.56.76
a=rtpmap:0 PCMU/8000
a=fmtp:0 annexb=no
a=rtpmap:8 PCMA/8000
a=rtpmap:101 telephone-event/8000
a=fmtp:101 0-16

FIG. 5

SIP/2.0 200 OK
Via: SIP/2.0/UDP 1.7.56.102:5060;branch=z9hG4bK5AB
To: <sip:8787@1.7.56.55>;tag=ds1dc5c6a
From: <sip:1.7.56.102>;tag=5B9F658-18A0

Content-ID: <83rqjqef3.218.1@10.1.1.1>
Content-Type: multipart/mixed;boundary=_1099508077295_171_282_269_257_17_

--_1099508077295_171_282_269_257_17_
Content-ID: <83rqjqef3.218.1@10.1.1.1>
Content-Type: application/sdp m=audio 18200 RTP/AVP 0 101
c=IN IP4 1.7.56.76
a=rtpmap:0 PCMU/8000
a=rtpmap:101 telephone-event/8000
a=fmtp:101 0-16

--_1099508077295_171_282_269_257_17_
Content-ID: <83rqjqef3.218.1@10.1.1.1>
Content-Type: application/media-caps m=audio 0 RTP/AVP 0 8 18 9 4 15 101
c=IN IP4 1.7.56.76
a=rtpmap:0 PCMU/8000
a=fmtp:0 annexb=no
a=rtpmap:8 PCMA/8000
a=fmtp:8 annexb=no
a=rtpmap:18 G729/8000
a=fmtp:18 annexb=yes
a=rtpmap:9 G722/8000
a=fmtp:9 annexb=no
a=rtpmap:4 G723/8000
a=fmtp:4 annexb=no
a=rtpmap:15 G728/8000
a=fmtp:15 annexb=no
a=rtpmap:101 telephone-event/8000
a=fmtp:101 0-16
a=inactive

TERMINAL CAPABILITIES SET EXCHANGE BETWEEN HETEROGENEOUS ENDPOINTS

CROSS-REFERENCE TO RELATED APPLICATIONS

This application is a continuation of U.S. patent application Ser. No. 11/505,556, filed Aug. 16, 2006, which is incorporated herein by reference in its entirety.

BACKGROUND

With the increased availability of broadband Internet connections, the use of Voice over Internet Protocol (VoIP) to make telephone calls over the Internet has also increased. Currently, there are two widely deployed VoIP standards: H.323 and Session Initiation Protocol (SIP). H.323 is an International Telecommunication Union Telecommunication Standardization Sector (ITU-T) specification for transmitting audio, video, and data across an Internet Protocol (IP) network. The H.323 standard addresses call signaling and control, multimedia transport and control, and bandwidth control for point-to-point and multipoint conferences. SIP is an application-layer signaling-control protocol used to establish, maintain, and terminate multimedia sessions involving media such as audio, video, and data.

An endpoint is an entity from which media originates or terminates. This endpoint can be, e.g., an H.323 terminal or a SIP user agent. Each VoIP session between endpoints will include three sets of communication flows: signaling, media streams, and media control messages. In the signaling stage, the two endpoints use a signaling protocol to establish the connection between the endpoints by negotiating the codec and IP ports that will be used for the session's media streams and media control messages. Different codecs are used for different types of sessions, such as G.711 for "toll quality" voice communication, G.729 for lower quality voice communication, and T.38 for transmitting fax data over IP.

Unfortunately, the SIP and H.323 protocols are not inherently compatible. Therefore, in order for a SIP endpoint to connect with an H.323 endpoint, some sort of interworking function is utilized in order to achieve compatibility. This is commonly accomplished using an interworking server, such as a Session Border Controller (SBC), which provides a protocol translation function between the two heterogeneous endpoints. However, due to incompatibilities in the call setup procedures defined by each of the protocols, this conventional protocol translation fails to provide the same functionality that would be provided in the case of a call between homogeneous endpoints.

DESCRIPTION OF THE DRAWINGS

FIG. 5 illustrates an example INVITE message including a media capabilities request.

FIG. 6 illustrates an example Answer message to a media capabilities request.

DESCRIPTION OF EXAMPLE EMBODIMENTS

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

During the signaling and negotiation steps between two H.323 endpoints, the two H.323 endpoints will exchange Terminal Capabilities Set (TCS) messages. Each TCS message will include a TCS capabilities list containing a description of the full set of media capabilities (e.g., the Real-Time Transport Protocol (RTP) compression schemes or codecs) that the sender supports. With the knowledge of the complete capabilities set from the TCS message, the H.323 endpoint can ascertain which codecs are acceptable when encoding RTP packets for transmission to the peer endpoint.

In contrast, a SIP endpoint can initiate a call by transmitting to the target SIP endpoint an INVITE request including an Offer listing all audio and DTMF media capabilities of the initiating endpoint. The target SIP endpoint will review the media capabilities from the Offer and if the target SIP endpoint supports a matching media capability, the target SIP endpoint will transmit a response message, such as a 200 OK, identifying the matching media capability. In this case, the initiating SIP endpoint is only aware of the matching media capability selected by the target SIP endpoint. If the initiating SIP endpoint wishes to invoke a different feature (such as, e.g., initiating a fax transmission using the T.38 protocol), the initiating SIP endpoint will transmit a second INVITE request identifying the new codec. If the target SIP endpoint supports the new codec, it will transmit a 200 OK response message. If not, the target SIP endpoint will transmit a 4xx MEDIA NOT SUPPORTED response message indicating that the codec is not supported by the target SIP endpoint. The call can then continue using the previously-established codec, if the initiating endpoint wishes to do so.

Figure 1:
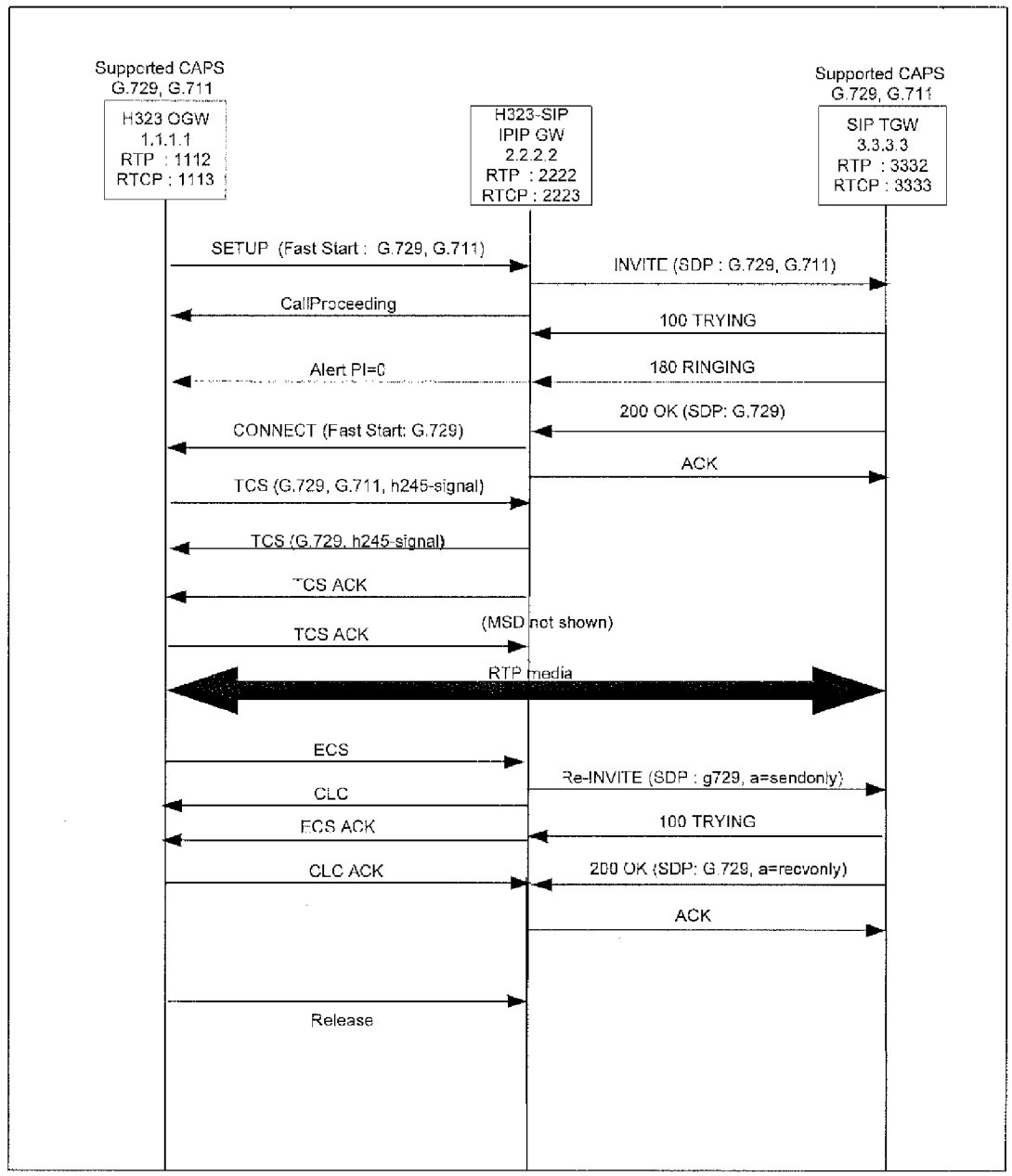
FIG. 1 illustrates an example call flow between an H.323 endpoint and a SIP endpoint.

FIG. 1 illustrates an example call flow between an H.323 endpoint and a SIP endpoint, with an IP-to-IP Gateway (IP-IPGW) providing the protocol translation function. This call flow illustrates the deficiencies of conventional protocol translation between an H.323 originating gateway (OGW) and a SIP terminating gateway (TGW). This call flow may be applicable for all H.323 and SIP devices. In this example, 1.1.1.1, 2.2.2.2, and 3.3.3.3 reflect hypothetical IP addresses, 1112, 2222, and 3332 reflect hypothetical RTP ports, and 1113, 2223, and 3333 reflect hypothetical RTCP ports for the OGW, IPIPGW, and TGW, respectively.

In this example, the H.323 OGW transmits a Fast Connect SETUP message including the codecs supported by the H.323 OGW (e.g., G.729 and G.711). The Fast Connect procedure enables the establishment of a media connection for basic point-to-point calls with a single round-trip message exchange. Fast Connect is initiated by the calling endpoint by including the Fast Start element in the initial SETUP message. The IP-to-IP Gateway translates this message into an INVITE message transmitted to the SIP TGW. The SIP TGW will respond with a 200 OK success message identifying G.729 as the codec selected by the SIP TGW for use during this session. This 200 OK message will be translated into a CONNECT message to the OGW identifying the codec selected by the SIP TGW.

At some point during the call, the OGW will transmit a TCS message including an identification of the codecs supported by the OGW (e.g., G.729, G.711). For a Fast Start call, the TCS message is transmitted when the Fast Start response is received. For a Slow Start call, the TCS message is transmitted when the H.245 connection is established or media establishment is requested The example shown in FIG. 1 is for a Fast Start call. Normally, when the OGW is communicating with another H.323 endpoint, the terminating H.323 endpoint would respond with a TCS message including all of that terminating endpoint's supported codecs. In this case, the IP-to-IP Gateway will respond with a TCS message including only the single codec provided in the 200 OK message. The telephone call can then continue with the exchange of Real-time Transport Protocol (RTP) media using the previously-identified codec, G.729. Unfortunately, because the TCS response to the OGW only identifies G.729, the OGW will assume that the TGW only supports G.729, even though the TGW actually supports both G.729 and G.711.

When an H.323 device initiates a supplementary service, such as, e.g., call forward, call transfer, etc., the initiating device may close the media path in one direction and may reopen it for music on hold (MoH). This is done by sending an Empty Capability Set (ECS) message, also known as Terminal Capability Set=0 (TCS=0), so that the peer side will respond back with a ECS ACK message and CLC. Since the media channel is being closed on the H.323 side, this closure is accomplished by the IPIPGW on the SIP side by transmitting a REINVITE message and receiving 200 OK and ACK responses from the peer. If this supplementary service requires any codec other than G.729, the H.323 OGW will not be able to complete the service because the OGW assumes that this supplementary service is unsupported by the TGW, regardless of the TGW's actual capabilities set. Thus, the call will fail, even though the TGW may have been able to support the supplementary service.

A number of solutions have been proposed for preventing this type of failure. In one case, when a SETUP message arrives at an IP-to-IP Gateway from an H.323 endpoint identifying a target SIP endpoint, the Gateway will transmit an OPTIONS message to query the target SIP endpoint. The SIP endpoint will then respond to the Gateway with a 200 OK message identifying all of the supported capabilities of that SIP endpoint. The Gateway will store this information and provide the complete list of supported capabilities to the H.323 endpoint in response to the TCS message.

Alternatively, when a SETUP message arrives from the H.323 endpoint, the Gateway may transmit an INVITE message to the SIP endpoint without an offer. The SIP endpoint will then respond with a 200 OK message including an offer identifying all of the SIP endpoint's supported capabilities. Again, these supported capabilities can then be stored by the Gateway and provided to the H.323 endpoint upon receipt of a TCS message.

Disadvantageously, these proposed solutions require the transmission of additional messages, thereby increasing the post-dial delay over the standard call flow described above with respect to FIG. 1.

Figure 2:
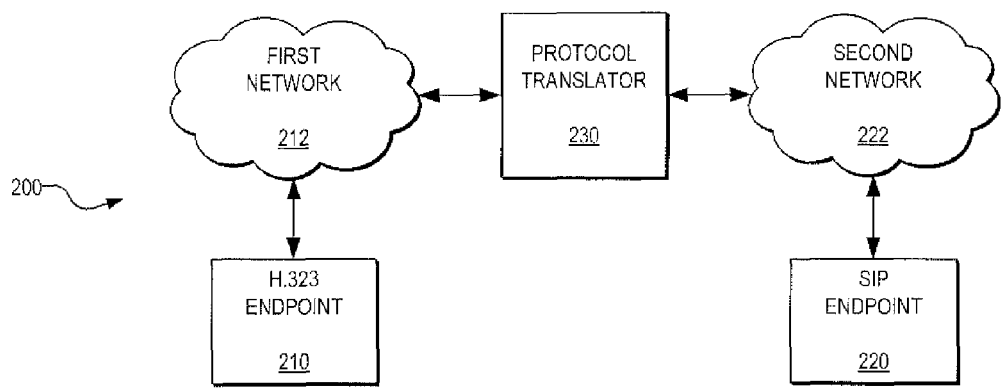
FIG. 2 illustrates an example VoIP environment.

FIG. 2 illustrates an example VoIP environment 200. This environment 200 includes a first H.323 endpoint 210 in a first network 212 and a second SIP endpoint 220 in a second network 222. A protocol translator 230 provides an inter-working function between the first network 212 and the second network 222. In some embodiments, the protocol translator 230 comprises a Session Border Controller (SBC), which provides native IP interconnects between different VoIP networks. In some embodiments, the first and second networks 212, 222 are VoIP networks controlled by separate service providers using different VoIP protocols, such as H.323 and SIP. In other embodiments, the first and second networks 212, 222 are networks operated by a single entity. Different variations are possible.

Figure 3:
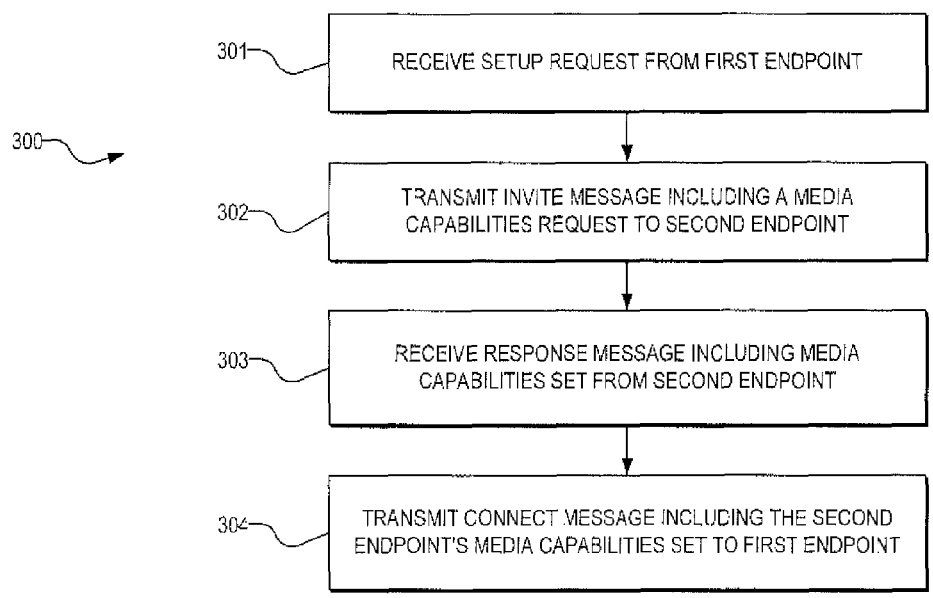
FIG. 3 illustrates an example method of interworking between an H.323 endpoint having a first set of media capabilities and a SIP endpoint having a second set of media capabilities.

FIG. 3 illustrates an example method 300 of interworking between an H.323 endpoint having a first set of media capabilities and a SIP endpoint having a second set of media capabilities. IP-based communications sessions may include any real-time interactive voice, video, or multimedia communication using layer 5 IP session signaling protocols, such as, e.g., SIP and H.323.

In step 301, the protocol translator 230 receives a SETUP request from the H.323 endpoint 210. In response to receiving the SETUP request from the H.323 endpoint 210, in step 302, the protocol translator 230 transmits an INVITE message to the SIP endpoint 220. This INVITE message includes an Offer and an informational header with a media capabilities request. In step 303, the protocol translator 230 receives a response message from the SIP endpoint 220. This response message includes a response header along with a response body containing a list of the second set of media capabilities of the SIP endpoint. This response body is in addition to the standard SDP body received as part of the Offer-Answer exchange. In step 304, the protocol translator 230 retrieves this media capabilities set from the SIP endpoint's Answer, and will transmit a TCS message to the H.323 including a listing of the SIP endpoint's media capabilities set.

Figure 4:
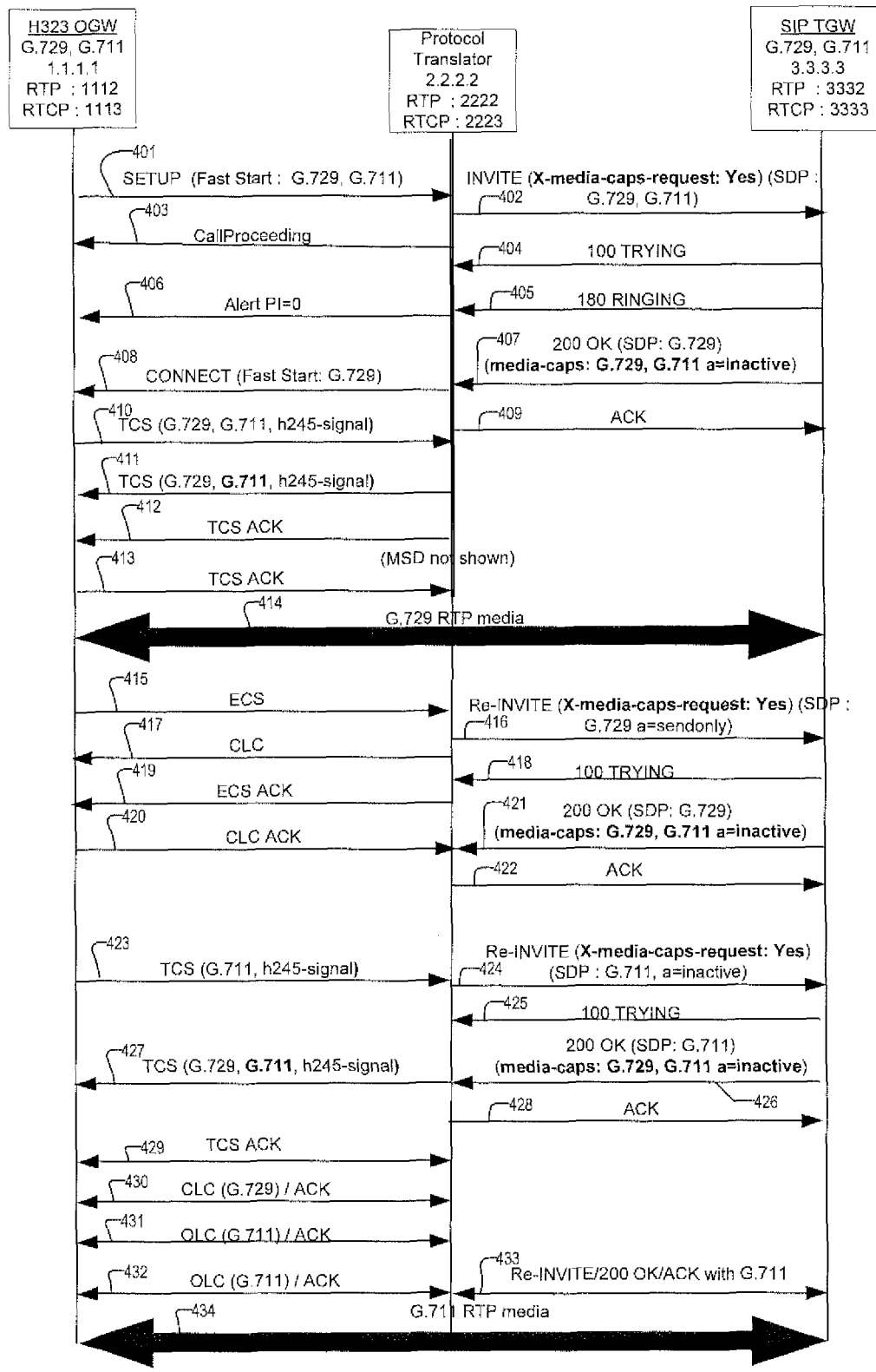
FIG. 4 illustrates an example call flow between an H.323 endpoint and a SIP endpoint.

FIG. 4 illustrates an example call flow between an H.323 endpoint 210 as the OGW and a SIP endpoint 220 as the TGW, with a protocol translator 230 (e.g., an IP-to-IP Gateway or a Session Border Controller) providing the interworking function. For clarity, not all communications for the session are shown. In this embodiment, both the OGW and TGW support the G.729 and G.711 media capabilities.

In 401, the OGW transmits a Fast Start SETUP message to the TGW. This SETUP message is received by the translator 230, which retrieves the media capabilities set (G.729 and G.711) from the message. In response to receiving this SETUP message, in 402 the translator 230 transmits an INVITE message with an Offer to the TGW, and in 403 the translator 230 transmits a CallProceeding message back to the OGW. The INVITE message includes a media capabilities request, an example of which is shown in FIG. 5.

In this example, the text in normal font represents the content of a conventional INVITE message that might be transmitted from an SBC to a SIP endpoint in response to receiving a SETUP message from an H.323 endpoint. According to conventional Offer-Answer protocol, the SIP endpoint will respond to the INVITE message with an Answer SDP ("Session Description Protocol"). In this embodiment, the INVITE message includes an additional informational header "X-media-caps-request: Yes", shown above in bold font. If the SIP endpoint TGW is configured to recognize this header, the TGW will understand that this header is requesting that the TGW provide a complete set of its media capabilities in its Answer. After transmitting a 100 Trying message in 404 and a 180 Ringing message in 405, the SIP endpoint in 407 may transmit to the translator 230 the example Answer shown in FIG. 6.

As with the INVITE message, the response from the SIP endpoint TGW is similar to the conventional Answer that would be received by an SBC from a SIP endpoint. However, in this embodiment, the response from the SIP endpoint comprises a multipart message including a media capabilities portion (shown on bold font), which lists the complete media capabilities set for the SIP endpoint. In this media capabilities portion, the port and c-line information is not relevant and can be omitted (e.g., the message will include c=0.0.0.0 or a=inactive or both).

The translator 230 will transmit in 406 a Progress Indicator information element (e.g., an Alert PI=0) to the H.323 endpoint, which indicates that there is no need to establish a media path for in-band tones or announcements. Next, in response to receiving from the SIP endpoint the Answer including the media capabilities set, the translator 230 will transmit in 408 a CONNECT message indicating that the called party has answered the call. This CONNECT message will include the media type identified by the SIP endpoint TGW in the 200 OK message (e.g., G.729). In 409, the translator 230 will transmit an ACK message to the SIP endpoint to indicate the conclusion of the transaction initiated by the INVITE message.

In this embodiment, the translator 230 has received from the SIP TGW a complete set of the SIP endpoint's media capabilities. This information is stored by the translator 230 but need not be transmitted to the H.323 OGW until a TCS message is received in 410. In 411, the translator 230 will retrieve the stored information regarding the SIP TGW's media capabilities and provide that information in a TCS message back to the H.323 OGW. TCS ACK messages are then exchanged between the H.323 OGW and the translator 230 in 412-413.

At this point, the signaling stage is completed and the H.323 OGW and SIP TGW may proceed with exchanging media streams in 414. (For clarity, the master slave determination (MSD) event messages are omitted.)

In conventional interworking scenarios, there is no efficient mechanism from passing all supported media capabilities from a SIP endpoint to an H.323 endpoint when the H.323 endpoint initiates the offer. In contrast, in the embodiment described above, both endpoints have exchanged complete sets of media capabilities without requiring additional exchange of messages in order to do so. Thus, the exchange of media capabilities does not excessively increase the time for connection between endpoints.

Because the H.323 OGW is aware of the media capabilities of the SIP TGW, the H.323 can proceed with initiating additional services that utilize the additional capabilities of the SIP TGW. For example, it may be desired to place the call on hold in order to initiate a supplementary service. In 415, the H.323 OGW transmits an Empty Capabilities Set (ECS) message. In response to receiving this message the translator 230 in 416 transmits a RE-INVITE message to the SIP TGW. This RE-INVITE message again includes the "X-media-caps-request: Yes" header. In other embodiments, the RE-INVITE message may omit the media capabilities request header since the translator 230 had previously received the complete capabilities list from the SIP TGW in response to the initial INVITE message.

In 417, the translator 230 transmits a Close Logical Channel (CLC) message to the H.323 OGW to indicate that the logical channel between the H.323 OGW and the SIP TGW is closed. In 418, the SIP TGW transmits a 100 TRYING message to the translator 230 and in 419-420, the H.323 OGW and translator 230 exchange ECS and CLC ACK messages. In 421, the SIP TGW transmits a 200 OK response and in 422, the translator 230 transmits a ACK message.

At this point, the H.323 OGW can initiate the call transfer to G.711 because the previous TCS message in 411 informed the H.323 OGW that the TGW supports G.711. Therefore, in 423-433, the H.323 OGW and SIP TGW can proceed with the exchange of signaling messages in order to initiate the exchange of media streams in 434.

Particular embodiments may provide various advantages not provided by prior art systems. For example, according to the H.323 protocol, the endpoints exchange the full media capabilities set in the TCS message exchange. Thus, when a specific feature is later invoked, there is no need to confirm that the peer endpoint supports the feature. In contrast, the SIP protocol utilizes an Offer-Answer model in which the offering endpoint does not receive the full capabilities set from the answering endpoint. Thus, according to the SIP protocol, there is a mechanism for obtaining confirmation of the support of a media capability in order to dynamically initiate a new feature during a call. In accordance with particular embodiments, H.323 and SIP endpoints may more effectively utilize the full set of capabilities of each other during calls. This can help to prevent unnecessary call failures and to provide a full utilization of both endpoints' capabilities.

As described above, the request for media capabilities can be added as a new header in the INVITE message transmitted to the SIP endpoint. Under the SIP protocol, the SIP message headers are extensible. Thus, SIP endpoints that are configured to support the media capabilities request will provide the requested information to the translator in the response message. However, SIP endpoints that are not configured to support the media capabilities request may still proceed with the session according to conventional methods, without exchanging full media capabilities. Thus, these embodiments may implement the present invention by utilizing the conventional call flow and signaling protocol, but with additional information contained in the headers which provide improved interoperability.

Furthermore, the additional information contained in the headers may include any of a variety of media capabilities. For example, according to the standard SIP protocol, the Offer will include all of the audio capabilities, but not other media capabilities, such as T.38 fax. Thus, if the one of the SIP endpoints attempts to initiate a T.38 session, an additional Offer must be transmitted in order to confirm the peer's support for T.38. In particular embodiments, all of the media capabilities from the endpoints are provided in response to the media capabilities request, not just audio capabilities. For example, audio, video, data, DTMF, fax, modem, and any other media capabilities may be included in response to the media capabilities request.

While the invention has been described in terms of particular embodiments and illustrative figures, those of ordinary skill in the art will recognize that the invention is not limited to the embodiments or figures described. For example, the call flows described above may vary, and in some embodiments, not all of the steps need to occur and the order of the steps may vary.

Figure 7:
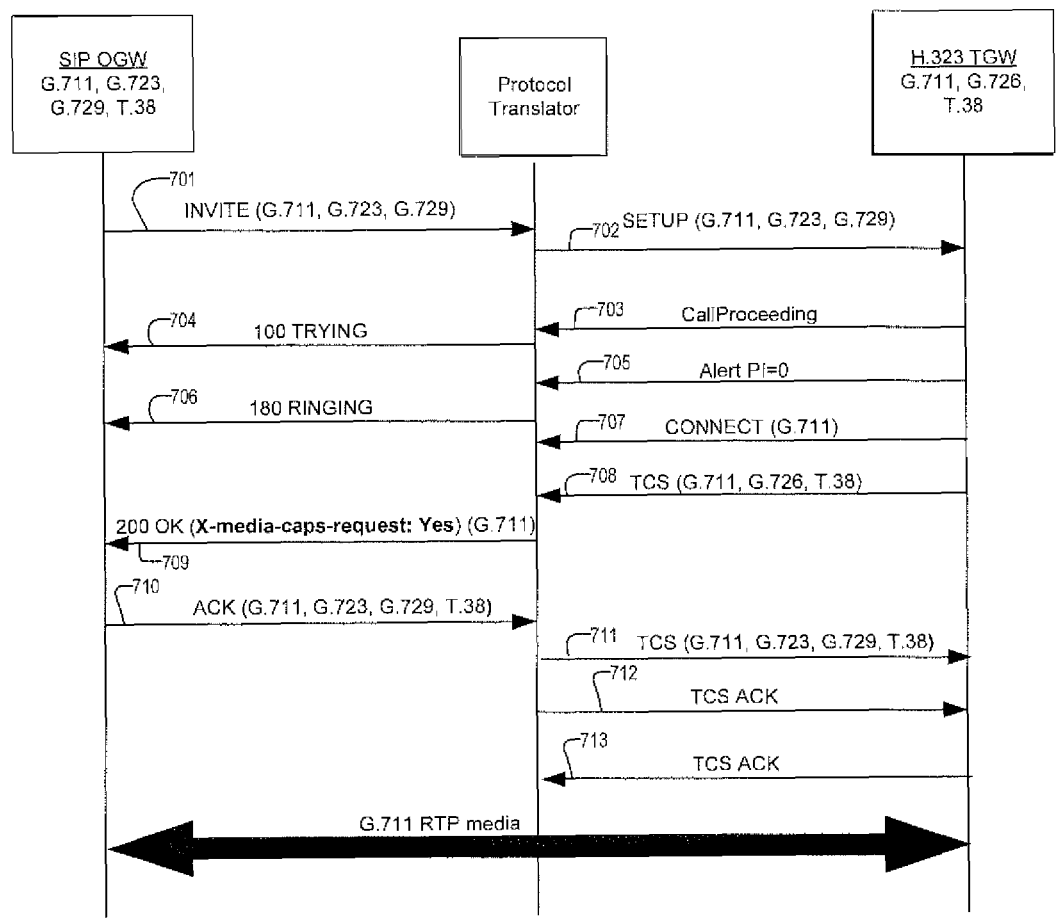
FIG. 7 illustrates an example call flow between a SIP endpoint and an H.323 endpoint.

For instance, the media capabilities request may be included in any message in which an Offer is made to a SIP endpoint. Thus, embodiments may also be used in which the SIP endpoint initiates a call to an H.323 endpoint, as shown in FIG. 7. In this embodiment, the SIP endpoint initiates the call in step 701 by transmitting an INVITE message, which is received by the protocol translator. The translator, in step 702, transmits a SETUP message to the H.323 endpoint including the list of media capabilities included in the INVITE message. After the call has connected in steps 703-707, the H.323 endpoint will transmit in step 708 a TCS message including a full media capabilities set. In response, the translator transmits in step 709 a 200 OK message to the SIP endpoint including the "X-Media-Request: Yes" header. The SIP endpoint will respond in step 710 with an ACK message including the SIP endpoint's full capabilities. The SIP endpoint's full capabilities set will then be transmitted in step 711 to the H.323 endpoint in a TCS response.

In various embodiments described above, the OGW's media capabilities are provided in a Fast Start SETUP message. In other embodiments, the call need not be a Fast Start call. For a conventional slow start H.323 call, the SIP TGW will still not include all support capabilities in its response. Therefore, the corresponding TCS response back to the OGW will not carry all capabilities of SIP endpoint. Hence, embodiments of the present invention may be used to ensure that the full media capabilities are exchanged between the heterogeneous endpoints.

In addition, in some of the embodiments described above, the protocol translator is implemented as part of an SBC or IP-to-IP Gateway. In other embodiments, the protocol translator may be implemented in any device that provides an interworking function between the two endpoints.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

We claim:

1. A system, comprising:
    a first interface for communication with an H.323 endpoint having a first plurality of media capabilities;
    a second interface for communication with a session initiation protocol (SIP) endpoint having a second plurality of media capabilities; and
    control logic configured to:
        receive a first message from the H.323 endpoint to the SIP endpoint, the first message including a first list of the first plurality of media capabilities;
        in response to receiving the first message, transmit an INVITE message to the SIP endpoint including a media capabilities request header that requests all media capabilities of the SIP endpoint; and
        receive a response message from the SIP endpoint, the response message including a media capabilities portion comprising a second list of all the media capabilities in the second plurality of media capabilities, the second list being in addition to a standard SDP body received from the SIP endpoint as part of an offer-answer exchange.

2. The system of claim 1, wherein the second list of all the media capabilities in the second plurality comprises at least two of audio, video, and data media capabilities.

3. The system of claim 1, wherein the control logic is configured to receive the first message as a setup request from the H.323 endpoint.

4. The system of claim 3, wherein the control logic is further configured to:
    in response to said receiving the response message from the SIP endpoint, transmit to the H.323 endpoint a connect message; wherein said setup request from the H.323 endpoint includes a setup header comprising at least one media capability, and said connect message includes a connect header comprising a matched media capability corresponding to one of the at least one media capabilities in the setup header.

5. The system of claim 3, wherein the control logic is further configured to:
    in response to the receiving the response message from the SIP endpoint, store the second list of all the media capabilities in the second plurality;
    receive a first terminal capabilities set (TCS) message from the H.323 endpoint; and
    in response to receiving the TCS message from the H.323 endpoint, retrieve the second list of all the media capabilities in the second plurality and transmit a second TCS message to the H.323 endpoint, the second TCS message including a second TCS capabilities list comprising one or more media capabilities from the second list of all the media capabilities in the second plurality.

6. The system of claim 5, wherein:
    the first TCS message includes a TCS capabilities list comprising the first list; and
    the second TCS capabilities list in the second TCS message comprises a list of the media capabilities from the second list that match the media capabilities from the first list.

7. The system of claim 1, wherein the control logic is configured to receive the response message as a 200 message.

* * * * *